United States Patent [19]

Fergason

[11] 4,385,844

[45] May 31, 1983

[54] NOVEL COMPOSITIONS, DEVICES AND METHOD

[75] Inventor: James L. Fergason, Kent, Ohio

[73] Assignee: Becton, Dickinson and Company, East Rutherford, N.J.

[21] Appl. No.: 189,808

[22] Filed: Sep. 22, 1980

Related U.S. Application Data

[63] Continuation-in-part of Ser. No. 6,267, Jan. 25, 1979, abandoned, which is a continuation of Ser. No. 785,609, Apr. 7, 1977, Pat. No. 4,140,016.

[51] Int. Cl.$^3$ .................. C09K 3/34; G01K 11/16; G01K 11/18; G01K 3/00
[52] U.S. Cl. ................................ 374/160; 116/216; 252/299.67; 252/299.7; 252/299.01; 428/1; 374/161; 374/162
[58] Field of Search .................. 73/356; 116/216; 252/299.67, 299.7, 299.01; 350/350 R; 428/1; 374/160, 161, 162

[56] References Cited

U.S. PATENT DOCUMENTS

| Re. 28,806 | 5/1976 | Saeva et al. ................ 252/299 |
|---|---|---|
| 3,650,603 | 3/1972 | Heilmeier et al. .......... 252/299 |
| 3,680,950 | 8/1972 | Haas et al. .................. 252/299 |
| 3,697,297 | 10/1972 | Churchill et al. ........... 252/299 |
| 3,703,331 | 11/1972 | Coldmacher et al. ....... 252/299 |
| 3,720,623 | 3/1973 | Cartmell et al. ............ 252/299 |
| 3,779,751 | 12/1973 | Haas et al. .................. 252/299 |
| 3,806,230 | 4/1974 | Haas ...................... 252/408 LC |
| 3,876,286 | 4/1975 | Deutscher et al. .......... 252/299 |
| 3,891,307 | 6/1975 | Tsukamoto et al. ........ 252/299 |
| 3,923,685 | 12/1975 | Oh .............................. 252/299 |
| 3,973,830 | 8/1976 | Tsukamoto et al. ........ 252/299 |
| 3,975,286 | 8/1976 | Oh .............................. 252/299 |
| 3,977,769 | 8/1976 | Tsukamoto et al. ........ 252/299 |
| 4,001,137 | 1/1977 | Steinstrasser .............. 252/299 |
| 4,016,094 | 4/1977 | Tsukamoto et al. ........ 252/299 |
| 4,022,706 | 5/1977 | Davis .......................... 252/299 |
| 4,066,567 | 1/1978 | Labes .......................... 252/299 |
| 4,077,260 | 3/1978 | Gray et al. .................. 252/299 |
| 4,140,016 | 2/1979 | Fergason ..................... 252/299 |
| 4,296,631 | 10/1981 | Fergason ................. 252/299.67 |

FOREIGN PATENT DOCUMENTS

| 2352664 | 5/1974 | Fed. Rep. of Germany ...... 252/299 |
|---|---|---|
| 2815172 | 10/1978 | Fed. Rep. of Germany ................. 252/299.67 |
| 140358 | 2/1980 | German Democratic Rep. ....................... 252/299.7 |
| 49-37884 | 4/1974 | Japan ........................ 252/299 |
| 463693 | 3/1975 | U.S.S.R. ..................... 252/299 |

OTHER PUBLICATIONS

Klanderman, B. H., et al., J.A.C.S., vol. 97, No. 6, pp. 1585–1586, (1975).
Gray, C., et al., Electronics Letters, vol. 9, No. 26, pp. 616–617, (1973).
Berreman, et al., Physical Rev. Lett., vol. 25, No. 9, pp. 577–581, (1970).

*Primary Examiner*—Teddy S. Gron
*Attorney, Agent, or Firm*—Kane, Dalsimer, Kane, Sullivan & Kurucz

[57] ABSTRACT

Disclosure is made of novel temperature sensing devices such as temperature indicating and recording devices. The devices of the invention differ from prior art devices in that they employ new and improved temperature indicating compositions. The temperature indicating compositions of the invention comprise an optically active, non-cholesteric inert compound in admixture with nematic type liquid crystal compounds. The optically active, inert compounds lend a visible point of reference to the compositions when the liquid crystals pass through their liquid transition points. The proportion of optically active, inert compounds added to the nematic liquid crystals is that proportion which will impart chirality or twist to the compositions of the invention and is dependent upon the twisting power of the optically active ingredient. The compositions of the invention are unique in that they possess very sharp liquid transition points, i.e.; clearing points over a very narrow temperature range. This is an ideal characteristic for compositions to be employed as accurate sensors of specific temperatures.

14 Claims, 4 Drawing Figures

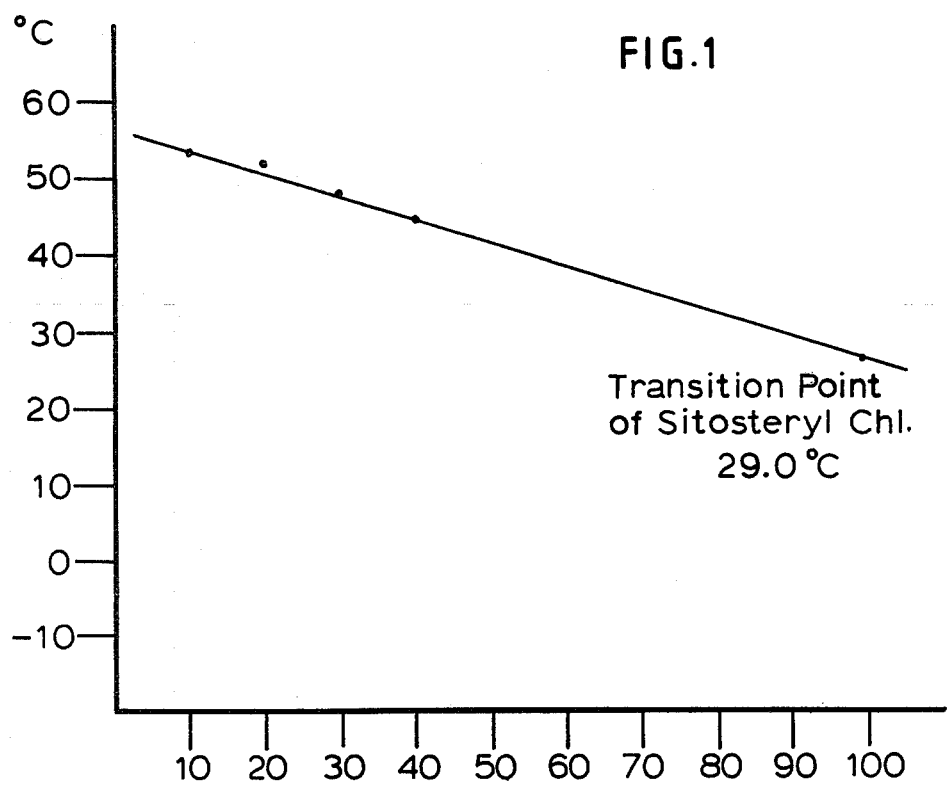
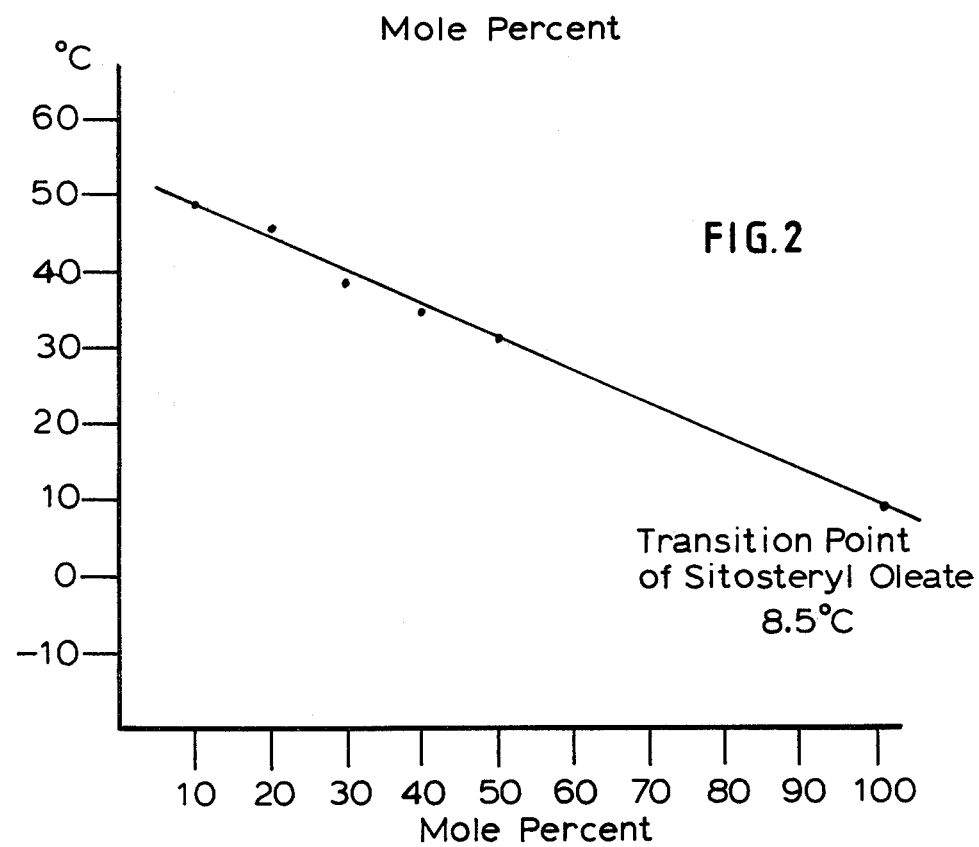

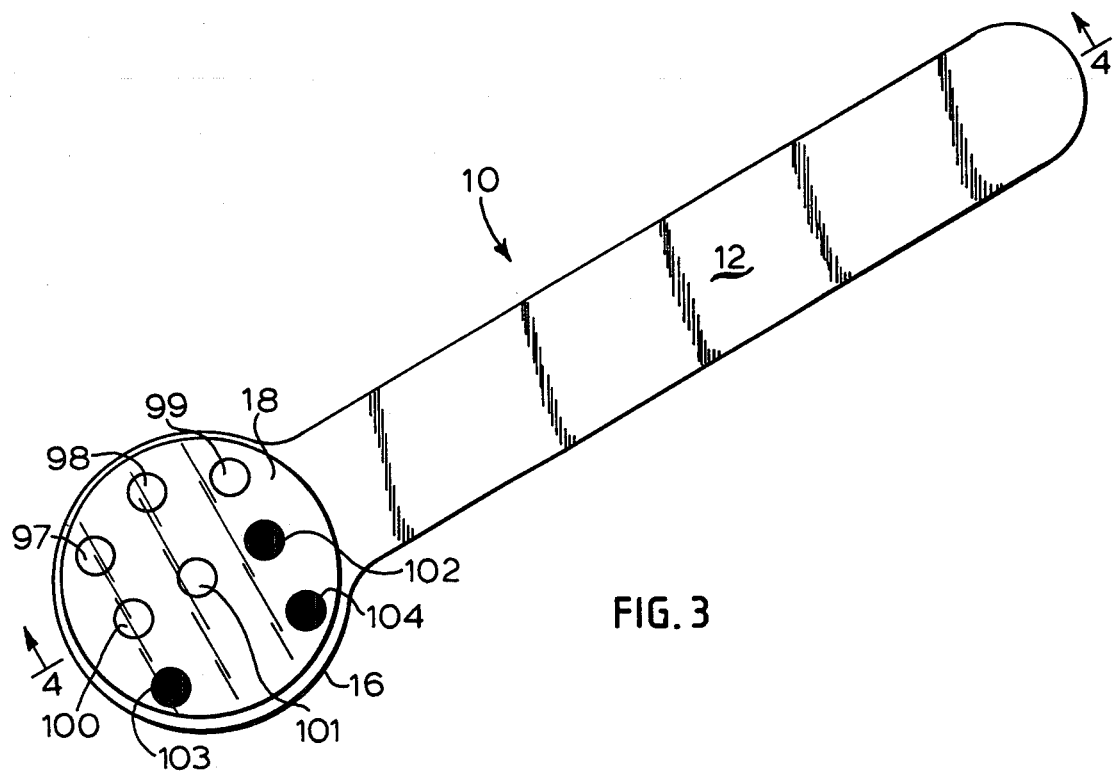
FIG. 3
FIG. 4
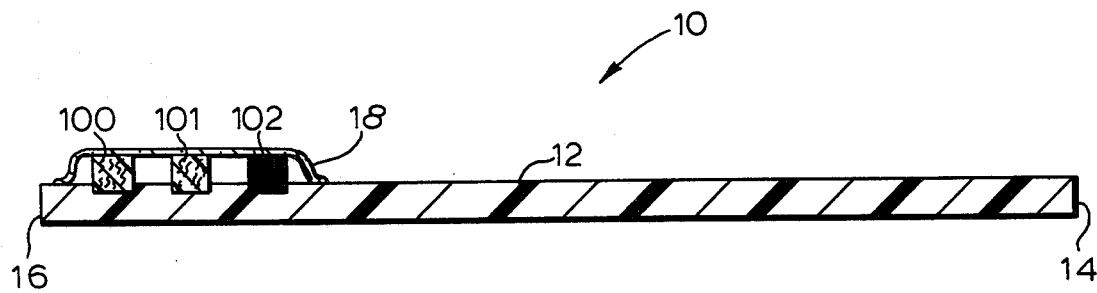

NOVEL COMPOSITIONS, DEVICES AND METHOD

CROSS-REFERENCE TO RELATED APPLICATIONS

This application is a continuation-in-part of my copending U.S. patent application Ser. No. 006,267 filed Jan. 25, 1979, now abandoned and which in turn was a continuation of U.S. application Ser. No. 785,609 filed Apr. 7, 1977 and issued as U.S. Pat. No. 4,140,016.

BACKGROUND OF THE INVENTION

1. Field of the Invention

The invention relates to temperature indicating compositions and more particularly relates to liquid crystal compositions, their use and temperature sensing devices employing them as indicator compositions.

2. Brief Description of the Prior Art

Temperature sensing devices including temperature recorders employing cholesteric liquid crystal compositions as the temperature sensitive indicator are generally well known; see for example U.S. Pat. Nos. 3,704,625 and 3,974,317. Such devices function by virtue of a color change exhibited by the liquid crystal indicators under certain temperature conditions. Liquid crystals are compounds which possess a so-called mesomorphic phase (sometimes referred to as the "mesophase"), intermediate between their solid crystal form and their isotropic liquid form. The mesomorphic phase of cholesteric liquid crystals is highly colored due to the periodic structure of the phase.

The color exhibiting cholestric liquid crystals are optically active and are said to be "optically negative". The observed color of the cholestric liquid crystal in its mesomorphic phase is a function of its chirality or "twist", which will be described in more detail hereinafter. Other liquid crystal compounds such as nematic type liquid crystals are said to be optically positive in the mesomorphic state and do not exhibit a specific color associated with periodic structure. It was heretofore known that one could admix cholesteric type liquid crystals with nematic type liquid crystals to impart chirality and therefore visibility to the mesomorphic phase of the resultant liquid crystal composition; see for example U.S. Pat. Nos. 3,650,603 and 3,984,343.

In general, the prior art temperature sensing and recording devices employing liquid crystals as the temperature indicator have not been entirely satisfactory for a number of reasons. For example, many liquid crystal indicator compositions are unstable and have short self lives. This is particularly true of mixtures of liquid crystals with so-called liquid transition point "elevator" or "depressant" additives which are heterogeneous mixtures and which tend to separate on standing. Many of such compositions which include hydrocarbon additives are particularly unstable. The hydrocarbon additives destroy crystallinity of the liquid crystals over prolonged periods of contact. After a relatively short period of time, the liquid transition points of such compositions will have shifted. Therefore, unless the temperature sensing device employing such a composition is used fairly rapidly after its manufacture, inaccurate results will be obtained. Another difficulty heretofore encountered with the prior art compositions is that the temperature range over which a given liquid transition point occurs may be so broad as to render the device useless for certain purposes, for example as a replacement for a medical clinical thermometer where accuracy within plus or minus 0.5° F. is desired. Many prior art temperature sensing devices using liquid crystal temperature indicators are too insensitive to measure such small differences in temperature.

The liquid crystal based temperature sensing compositions of my invention are relatively stable over long periods of time even if the ingredients are relatively impure. They also pass through their liquid transition points very rapidly and over relatively narrow temperature ranges. In other words, the liquid transition points for the liquid crystal compositions of my invention are very sharp and occur at or very near to any specific desired temperature point. In addition, the compositions of my invention exhibit controlled hysteresis and are therefore particularly suited for use as a disposable temperature recorder for clinical medical use. The compositions of the invention also provide a means of color control in visually indicating temperature sensing devices.

Mixtures of liquid type crystals with nematic type liquid crystals have heretofore been known in the prior art; see for example U.S. Pat. Nos. 3,650,603; 3,666,881; 3,720,623; 3,923,685; 3,931,041; 3,956,169; 3,973,830; and U.S. Pat. No. RE 28,806. Other U.S. patents representative of the prior art are U.S. Pat. Nos. 3,114,830; 3,529,156; 3,716,289; and 3,997,463.

SUMMARY OF THE INVENTION

The invention comprises a temperature indicating composition, which comprises;

(a) an optically active, non-cholesteric, inert compound; and (b) a nematic type of liquid crystal; the proportion of (a) being that which selectively scatters light from the visible spectrum at temperatures below the liquid transition point for said composition and which will impart a color change to the composition when the composition is warmed to its liquid transition point.

The invention also comprises a method of providing liquid crystal based temperature indicating compositions of improved accuracy and temperature sensing devices employing the improved compositions of the invention.

The compositions of the invention are useful as temperature indicators.

The term "liquid transition point" as used throughout the specification and claims means the point of temperature at which a liquid crystal compound or liquid crystal composition passes from the mesomorphic phase to the form of an isotropic liquid. This temperature point is also referred to occasionally by those skilled in the art as a "clearing point". The term "inert" is used herein to mean that the optically active compound will not chemically react with the nematic type of liquid crystal it is to be mixed with, nor will it adversely affect the desired properties of the compositions of the invention under conditions of use, as will be described more fully hereinafter. Advantageously the optically active, inert compound selected will be soluble in the compositions of the invention. The optically active, inert compounds employed as ingredients of the compositions of the invention are those having sufficient "twist" or chirality to provide visibility to the compositions of the invention in the mesomorphic phase. The term "twist" as used herein refers to the phenomenon observed when an optically active species is introduced into a nematic liquid. The nematic liquid takes a twisted configuration in all cases at low concentration and most cases at high concentration. The pitch of the twist is inversely proportional to the molar concentration of the optically active additive (the pitch is related to the wavelength of light scattered by the index of refraction of the liquid crystal; Pitch = n $\lambda_{max}$). Thus, $$P = \frac{T}{\text{mole fraction of optically active compound}}$$

wherein T is the constant of proportionality and is a material parameter. The optically active compounds employed as ingredients in the compositions of the invention will have a twist such that, $$\frac{T}{n} < 550\mu$$

where n is the index of refraction of the liquid crystal ingredients.

BRIEF DESCRIPTION OF THE DRAWINGS

FIG. 1 is a graph depicting the linearity of liquid transition points in a series of compositions of the invention.

FIG. 2 is a graph depicting the linearity of the liquid transition points in another series of compositions of the invention.

FIG. 3 is an isometric view of a device of the invention employing compositions of the invention as temperature indicators.

FIG. 4 is a cross-sectional side elevation along lines 4—4 of FIG. 3.

DETAILED DESCRIPTION OF THE PREFERRED EMBODIMENTS OF THE INVENTION

Optically active, non-cholesteric, inert compounds employed as ingredients of the compositions of the invention are generally well-known compounds and include for example derivatives of alcohols such as 1-methol, 1-linanool, d-mannitol, d-borneol and d-quercitol; derivatives of ketones such as d-camphor, d-3-methylcyclohexanone 1-methone and 1-6-isopropyl-3-cyclohexanone; derivatives of carboxylic acids such as d-citronellic acid, 1-citronellic acid, d-chaulmoogric acid, 1-campholic acid, abietic acid, 1-arabonic acid, d-tartaric acid and 1-ascorbic acid, derivatives of aldehydes such as d-citronellal; derivatives of alkenes such as 1-B-pinane, d-silvesterene, and d-limonene; derivatives of amines such as 1-2-methylpiperidine; derivatives of nitriles such as d-mandelonitrile; derivatives of amides such as d-hydrocarbamide; and mixtures thereof.

A preferred class of optically active, non-cholesteric inert compounds are those liquid crystals having high or short wave-length pitch. Such non-cholesteric liquid crystals are well-known compounds as is the method of their preparation.

The degree of twist imparted by the optically active compound to the compositions of the invention is important.

Advantageously the optically active compound selected as an ingredient of a particular composition of the invention is one having a liquid transition point near the event temperature to be indicated, i.e.; within about 25°–35° C., preferably 20°–25° C. of the desired event temperature indication.

Nematic type liquid crystals are also a well-known class of compounds as are methods for their preparation. Preferred nematic type liquid crystals for use as ingredients of the compositions of the invention are alcohol esters and nematic forming ester derivatives. Particularly advantageous for use as ingredients of the compositions of my invention are nematic liquid crystals as illustrated by the 4-alkylphenyl-4-alkoxybenzoates such as 4-n-pentylphenyl-4-n-methoxybenzoate, 4-n-pentylphenyl-4-n-pentyloxybenzoate and the like; the 4-alkylphenyl-4-alkylbenzoates such as 4-n-pentylphenyl-4-n-hexylbenzoate, 4-n-pentylphenyl-4-n-heptylbenzoate and the like; the 4-alkoxyphenyl-4-alkylbenzoates such as 4-n-butoxyphenyl-4-n-hexylbenzoate, 4-n-butoxyphenyl-4-n-heptylbenzoate and the like; the 4-alkoxyphenyl-4-alkoxybenzoates such as 4-n-butoxyphenyl-4-n-pentyloxybenzoate, 4-n-pentyloxyphenyl-4-n-methoxybenzoate and the like.

In the preferred compositions of the invention, mixtures of at least two different nematic type liquid crystals are employed as the nematic type liquid crystal ingredient. The blend of different nematic type liquid crystals provides a liquid crystal composition with a liquid transition point intermediate to that for the ingredient liquid crystals. The proportions of the two nematic liquid crystals may be varied so as to obtain a number of compositions with a range of intermediate liquid transition points. In this manner, it is possible to obtain a plurality of liquid crystalline compositions differing in liquid transition points but only differing in composition by the proportion of nematic ingredients. This provides a plurality of indicating compositions which are uniform in structure and behavior. In addition, since the liquid transition point for each composition prepared is in direct proportion to the molar ratio of nematic type liquid crystal ingredients, one can prepare a series of compositions with a linear range of liquid transition points. In fact, having determined the end points of the desired range of liquid transition points, one can prepare the compositions of the invention which will provide the intermediate liquid transition points by a simple calculation of the molar ratios of the ingredient nematic type liquid crystals. This is a valuable manufacturing advantage.

The optically active, non-cholesteric inert ingredient interacts with the nematic ingredients of the compositions of the invention. The optically active ingredient causes the nematic to "twist" to a degree that light is reflected by the liquid crystal composition of the invention in the visible region of the spectra, i.e.; light is scattered.

The compositions of the invention may be prepared by simple admixture of the above described ingredients. For example, the procedure for obtaining a stable, homogeneous mixture of nematic and non-cholesteric type liquid crystals is well-known to those skilled in the art. In general, the procedure comprises placing the desired proportions of fairly pure ingredient compounds in an appropriate vessel and heating them while stirring until a uniform isotropic liquid solution is obtained. The isotropic liquid is then allowed to cool slowly to room temperature. During cooling, the mixture enters a mesomorphic state. Stirring while the ingredients are in the isotropic liquid solution form is advantageous for obtaining homogenity of mixture. The homogenity of the mixture is advantageous.

The proportion of optically active compound to nematic type of liquid crystals employed in the preparation of the compositions of the invention is important. In general, sufficient optically active compound is provided to impart color (light scattering) to the compositions of the invention in their mesomorphic phase. The optimal proportion will depend on the degree of twist found in the optically active compound. The optimal proportion may be found by trial and error technique as those skilled in the art will appreciate. More specifically, the proportion of optically active compound should be such as to provide a concentration thereof whereby pitch, as determined by twist, divided by the index of refraction multiplied by the mole fraction of optically active ingredient is between 680μ and 480μ, preferably 600μ to 440μ. In general, the proportion of non-cholesteric, inert liquid crystal compound will lie within the range of from about 25 to about 60 percent by weight of the total composition.

Although the use of a single optically active compound gives the desired result in the compositions of the invention, mixtures of such compounds, for example mixtures of the above described optically-active liquid crystals may be used as the optically active, inert ingredient.

As described above, the preferred compositions of the invention include blends of at least two nematic type liquid crystal compounds. It may be advantageous if the individual nematic type liquid crystals selected for admixture have liquid transition points close to each other, i.e.; within about 20 degrees centigrade, of one another. However, this is not essential. It is also advantageous if the nematic type crystals are selected for combination with structurally similar nematic type liquid crystals. The close or similar structures of the combined nematic liquid crystals assure uniformity of color observed in the compositions of the invention. This is an advantage for reading the temperature indicators in which the compositions of the invention function as temperature sensing indicators. Representative of preferred combinations of nematic liquid crystals which may be advantageously employed in the compositions of the invention are those listed below in Table I together with their individual liquid transition points.

TABLE I

| Nematic Crystal Mixtures | Liquid Transition Point (°C.) |
| --- | --- |
| 4-n-pentylphenyl-4-n-pentyloxybenzoate and | 55° |
| 4-n-pentylphenyl-4-n-methoxybenzoate or | 42° |
| 4-n-pentylphenyl-4-n-methoxybenzoate and | 42° |
| 4-n-butylphenyl-4-n-heptylbenzoate or | 15° |
| 4-n-hexyloxyphenyl-4-n-butylbenzoate and | 50° |
| 4-n-heptyloxyphenyl-4-n-butylbenzoate or | 43° |
| 4-n-ethoxybenzyl-4-n-butylaniline and | 75.6° |
| 4-n-butyloxybenzyl-4-n-butylaniline | 72.1° |

As stated previously, by the blending of different molar proportions of the different nematic type liquid crystals, one can obtain a plurality of nematic liquid crystal compositions having a range of liquid transition points intermediate to the liquid transition points of the ingredient nematic type liquid crystals. The range is linear and in direct relationship to the molar proportions of component liquid crystals. Addition of the required proportion of optically active, inert compound will generally depress somewhat the liquid transition point observed for the mixtures of nematic type liquid crystals. However this does not destroy the linear relationship described above. Thus, one can select proportions of the ingredients of the compositions of the invention so as to obtain predictable liquid transition points along a linear scale. This is a manufacturing advantage enabling one to select desired temperature end points and then predict compositional mixtures which will give intermediate liquid transition points between the end points.

The following examples describe the manner and process of making and using the invention as set forth the best mode contemplated by the inventor of carrying out the invention but are not to be construed as limiting.

EXAMPLE 1

A series of compositions A–E are prepared by mixing varying molar proportions of 4-n-pentylphenyl-4-n-pentyloxybenzoate (PPPOB) with varying molar proportions of sitosteryl oleate. The mixtures are heated to a temperature of circa 100° C. while stirring to obtain a homogeneous mixture. The mixtures are then allowed to cool to room temperature. The proportions of ingredients for each mixture, their liquid transition points and the colors of the mixtures below their liquid transition points are shown in Table II, below.

TABLE II

| Composition | Molar % of Sitosteryl Oleate | Molar % of PPPOB | Color | Transition Point |
| --- | --- | --- | --- | --- |
| A | 10% | 90% | off color | 48.7° C. |
| B | 20% | 80% | lt. red | 45.4° C. |
| C | 30% | 70% | red | 38.4° C. |
| D | 40% | 60% | green | 34.7° C. |
| E | 50% | 50% | blue | 31.1° C. |

Upon heating the mixture A–E to their liquid transition points, the color disappears as an indication that the indicated temperature has been reached. The compositions exhibit hysteresis.

Referring now to FIG. 2 of the accompanying drawings, one may observe the graph plotting showing the linearity of the liquid transition points for the compositions (A) through (E) prepared as described above. The compositions (A) through (E) as shown above are useful as the indicating compositions for a liquid crystal clinical temperature recorder employable for medical diagnosis.

EXAMPLE 2

Repeating the procedure of Example 1, supra., but replacing the sitosteryl oleate as used therein with an equal proportion of sitosteryl chloride a series of compositions of the invention identified as F-I is prepared. The composition and liquid transition point for each mixture below its liquid transition point is plotted graphically in FIG. 1, of the accompanying drawings.

Upon heating to the liquid transition point, the mixtures F-I lose color. The compositions F-I exhibit hysteresis properties.

Referring to FIG. 1, one may observe the linearity of the graph plotting of the liquid transition points for the compositions of mixtures F-I. The compositions F-I are useful as indicating compositions for liquid crystal clinical temperature recorders, useful in medical diagnosis.

The Examples 1–2 show one of the advantages of the compositions of the invention for manufacturing thermal indicating devices. As shown by the examples, the liquid transition point may be controlled directly by the variation of the mole fraction of the nematic type liquid crystal ingredients. It will also be observed that a relatively large change in the mole fraction of the ingredients results in a relatively small shift in liquid transition point, assuring accurate results when the compositions are used as temperature sensing indicators.

EXAMPLE 3

Following the procedure of Example 1, supra., but replacing the sitosteryl oleate as used therein with an equal proportion of any other non-cholesteric, inert, optically active compound referred to herein, there is obtained a plurality of series of compositions of the invention, useful as temperature indicating compositions.

EXAMPLE 4

Following the procedure of Example 1, supra., but replacing the PPPOB as used therein with equal proportions of
4-n-pentylphenyl-4-n-methoxylbenzoate,
4-n-butylphenyl-4-n-heptylbenzoate,
4-n-hexyloxyphenyl-4-n-butylbenzoate,
4-n-heptyloxyphenyl-4-n-butylbenzoate,
4-n-ethoxybenzyl-4-n-butylaniline, or
4-n-butyloxybenzyl-4-n-butylaniline,
respectively, compositions of the invention are obtained which exhibit hysteresis and which within each series form a linear array of liquid transition points.

The liquid crystal compositions of the invention are particularly useful as the temperature indicating component of a medical or clinical temperature indicating and recording device. Referring now to FIG. 3, an isometric view of an embodiment temperature recorder, one may appreciate the utility of the compositions of the invention. In FIG. 1, clinical temperature recorder 10 comprises a base or support member 12 including a handle portion 14. End 16 of the support member 12 is designed to be placed in the oral cavity of a patient whose temperature is desired. Disposed on end 16 are a plurality of indicating compositions of the invention. Each of the indicating compositions disposed on end 16 of member 12 are identified by the temperature (in degrees F.) at which the indicating composition will pass through its liquid transition point. Thus, the liquid crystal composition of the invention disposed on end 16 and identified as "97" will change from its colored mesomorphic phase to a colorless state if the patient's temperature exceeds 97° F. As a further illustration, the liquid crystal composition of the invention disposed on end 16 and identified as "101" will pass from its colored mesomorphic phase to the colorless isotropic liquid phase if the patient's temperature exceeds 101° F. Since the liquid crystal compositions of the invention exhibit hysteresis, i.e.; "memory" when the recorder 10 is withdrawn from the patient's oral cavity, one may readily observe the highest temperature to which the recorder 10 was exposed by viewing the colorless liquid crystal compositions disposed thereon. Hysteresis may be controlled for any desired period up to several hours. In the illustration of FIG. 3, the patient's temperature was between 101° F. and 102° F. as indicated by the colorless state of the indicator "101" and those compositions below the "101" indicator.

Support member 12 may be fabricated from any rigid, semirigid or flexible support material which is chemically and physically inert towards the indicator compositions disposed thereon. Illustratively, member 12 may be fabricated from paper which is coated with polyethylene or like protective film. Alternatively, member 12 may be fabricated from cellulose acetate, cellulose acetate butyrate, polyvinyl chloride, polyethylene, polyvinyl alcohol, polyvinylpyrrolidone and the like. Preferably support member 12 is of a dark color to absorb light and permit observation of the light scattering effect of the indicator composition.

The indicator compositions may be coated on support member 12, using conventional techniques such as by gravure printing, silk screen printing and like methods. Advantageously the thickness of the coating of the indicator compositions of the invention on member 12 are from about 10 to about 125 microns. The compositions of the invention may be applied directly to the surface of member 12. In such case it is preferable that the coatings of indicator compositions are then protected from the atmosphere and other contaminants by a thin film overlayer 18 as shown in FIGS. 3 and 4. Overlayer 18 may be any transparent or translucent material immiscible with the indicator composition, for example casein glue, polyvinyl alcohol, polyethylene, methacrylate and the like. The structural details of recorder 10 may be seen further in, FIG. 4, a cross-sectional side elevation along lines 4—4 of FIG. 3. However, it is preferable that the liquid crystal compositions of the invention are first encapsulated and the encapsulated compositions affixed to support member 12 by conventional and known technique. Encapsulated material generally has a longer shelf-life, brighter colors and enhanced stability. The techniques of encapsulation of liquid crystals are generally well known; see U.S. Pat. No. 2,800,457 describing closed core microencapsulation and U.S. Pat. No. 3,341,466 describing macroencapsulation.

Those skilled in the art will appreciate that many modifications of the preferred embodiments described above may be made without departing from the spirit and the scope of the invention.

what is claimed:
1. A temperature indicating composition for use in a thermometric device, which comprises;
 (a) 25 to 60 percent by weight of an optically active, non-cholesteric, inert compound; in admixture with
 (b) 40 to 75 percent by weight of a mixture of two different nematic types of liquid crystal selected from the group consisting of 4-alkylphenyl-4-alkoxybenzoates, 4-alkylphenyl-4-alkylbenzoates, 4-alkoxyphenyl-4-alkylbenzoates, and 4-alkoxyphenyl-4-alkoxybenzoates, said two having liquid transition points within about 20° C. of each other; the proportion of (a) being that which selectively scatters light from the visible spectrum at temperatures below the liquid transition point for said composition and which will impart a color change to the composition when the composition is warmed to its liquid transition point.
2. The composition of claim 1 wherein the concentration of the optically active, inert compound is such that the pitch of the composition is in the range between 680μ and 440μ.
3. The composition of claim 2 wherein the range is between 600μ and 480μ.

4. The composition of claim 1 wherein the optically active, inert compound has a twist, divided by the index of refraction for the liquid crystal, of less than 550μ.

5. An improved temperature recording device, which comprises;
   an opaque support member;
   a first liquid crystal composition disposed on said support member, said composition comprising a composition according to claim 1; and
   a second liquid crystal composition disposed on said support member, said second composition comprising a composition according to claim 1;
   the liquid transition point for said first liquid crystal composition differing from the liquid transition point for said second liquid crystal composition.

6. The device of claim 5 wherein said support member is a dark colored material which is physically and chemically inert towards the first and second liquid crystal compositions.

7. The device of claim 5 wherein said first and second liquid crystal compositions are disposed on said support member by coating thereon in a thickness of from about 10 to about 125 microns.

8. The device of claim 5 wherein said first and second compositions are covered with a transparent or translucent film to protect them from the atmosphere.

9. The device of claim 5 wherein said first and second liquid crystal composition are encapsulated.

10. The deveice of claim 5 wherein the concentration of the optically active, inert compound in each composition is such that the pitch of the composition is in the range between 680μ and 440μ.

11. The device of claim 10 wherein the range is between 600μ and 480μ.

12. The device of claim 5 wherein the optically active, inert compound in each composition has a twist, divided by the index of refraction for the liquid crystal, of less than 550μ.

13. A temperature recording device which comprises;
    an opaque support member; and
    a temperature indicating composition, which comprises
    a composition according to claim 1 disposed on said support member.

14. A device according to claim 13 wherein a plurality of temperature indicating compositions are disposed on said support member, each of said compositions differing from the other in liquid transition point, said liquid transition points being spread over a range of from 0° to 100° C.

* * * * *